United States Patent [19]
Ishibashi et al.

[11] Patent Number: 6,095,103
[45] Date of Patent: Aug. 1, 2000

[54] EXHAUST CONTROL VALVE STRUCTURE FOR 2-CYCLE ENGINE

[75] Inventors: Yoichi Ishibashi; Masahiro Asai, both of Saitama, Japan

[73] Assignee: Honda Giken Kogyo Kabushiki Kaisha, Tokyo, Japan

[21] Appl. No.: 09/083,666

[22] Filed: May 22, 1998

[30] Foreign Application Priority Data

May 23, 1997 [JP] Japan .................................. 9-150468

[51] Int. Cl.[7] .................................................. F02B 75/02
[52] U.S. Cl. .................................. 123/65 PE; 123/65 V; 123/65 VA
[58] Field of Search ........................... 123/65 PE, 65 PD, 123/65 V, 65 VA, 190.2

[56] References Cited

U.S. PATENT DOCUMENTS 4,926,809  5/1990  Allen ..................................... 123/190.2

FOREIGN PATENT DOCUMENTS

| | | |
|---|---|---|
| 56-56915 | 5/1981 | Japan . |
| 62-59194 | 3/1987 | Japan . |
| 3-156122 | 7/1991 | Japan . |
| 5-246385 | 9/1993 | Japan . |
| 7-71279 | 3/1995 | Japan . |
| 7-35726 | 4/1995 | Japan . |
| 7-97912 | 4/1995 | Japan . |
| 7-180556 | 7/1995 | Japan . |

*Primary Examiner*—Henry C. Yuen
*Assistant Examiner*—Brian Hairston
*Attorney, Agent, or Firm*—Birch, Stewart, Kolasch & Birch, LLP

[57] ABSTRACT

An exhaust passage for connecting to an exhaust port of a cylinder is provided. The exhaust passage includes a first path extending in a direction generally orthogonal to the central axis of the exhaust port. A second path connects the first path and the exhaust poil and a control valve is provided in the first path. The rotational axis of the exhaust control valve is generally parallel to the direction in which the first path extends. The surface area of an opening connecting the first path and the second path is variable as the exhaust control valve rotates, so as to carry out controlled combustion and exhaust timing. This makes it unnecessary to provide a hollow section for housing an exhaust control valve and bearing at a position close to the exhaust. It is also possible to reduce the size of a cylinder block and to realize smooth flow of exhaust gases by making the inner peripheral surface of the exhaust passage smooth.

18 Claims, 7 Drawing Sheets

EXHAUST CONTROL VALVE STRUCTURE FOR 2-CYCLE ENGINE

BACKGROUND OF THE INVENTION

1. Field of the Invention

The present invention relates to a 2-cycle engine provided with an exhaust control valve for varying a cross sectional area of an exhaust passage leading to an exhaust port, and particularly to a structure enabling logical provision of an exhaust control valve for a 2-cycle engine.

2. Description of Background Art

Two-cycle engines have been known as engines which are compact but can produce a high output because of their relatively simple structure and mechanism. Two-cycle engines have been widely applied to motorcycles, small boats, and the like.

In two-cycle engines, valves are disposed near the exhaust ports, and are opened or closed in order to control exhaust gases, thereby enabling the engine to operate under optimum conditions.

For instance, the two-cycle engine disclosed in Japanese Patent Laid-open Publication No. Hei 7-71279 or No. Hei 7-180556 includes exhaust control valves disposed on inner walls of exhaust passages near upper edges of exhaust ports in order to open or close the exhaust ports. When the engine is operating at a low speed or under a low load, the exhaust control valves substantially fully close the exhaust ports, optimally controlling pressure in the cylinders, activating fresh air in combustion chambers using thermal energy of already burnt gases remaining therein, realizing combustion in an active and hot atmosphere in which self-ignition combustion is carried out, and improving fuel economy and promoting purification of exhaust gases.

Japanese Patent Laid-open Publication No. Sho. 56-56915 exemplifies the two-cycle engine in which exhaust control valves for varying exhaust emission timing are positioned on inner walls of exhaust passages near upper edges of exhaust ports. When the engine is operating at a high speed, the exhaust control valves are fully opened to advance the timing for opening the exhaust ports (i.e., exhaust emission timing), thereby promoting discharge of exhaust gases. Conversely, when the engine is operating at a low speed, the exhaust control valves are nearly closed to retard the exhaust emission timing and prevent fresh air from blowing through the cylinders.

In the foregoing two-cycle engines, the exhaust control valves are supported by a pivot, are positioned near the upper edges of the exhaust ports, and are activated to vary the open areas of the exhaust ports.

Further, when the exhaust timing-is controlled, the edge of each exhaust control valve (i.e., the edge for opening or closing each exhaust port) is in contact with an inner surface of the exhaust port. This means that the pivot for supporting the exhaust control valves should be positioned as close as possible to the exhaust ports. If the pivot is positioned far from the exhaust ports, the exhaust control valves are subject to an increase in their turning radius, and suffer from reduced rigidity in their moving parts and an enlarged structure.

However, in the foregoing two-cycle engines, the exhaust control valves are directly supported by the cylinder block where the exhaust ports are formed. Therefore, in two-cycle engines, the cylinder block needs to be subjected to a complicated machining process for forming bearings and so on for receiving the pivot, so that it is difficult to attach the exhaust control valves to the cylinder block. Further, when the pivot is interposed between the cylinder block parts as in the last mentioned publication, the bearings should be precisely formed on surfaces of the cylinder block parts to be joined. This results in reduced efficiency in manufacturing engines.

Since the exhaust control valves are exposed to hot exhaust gases, the bearings and so on should have a cooling member. However, such a cooling member is difficult to add because structure for mounting the exhaust control valves is complicated.

In the case of an engine having multiple cylinders, there is a connection between control valves so as to drive the exhaust control valve of each cylinder in synchronism, but since each exhaust control valve is provided close to the exhaust port of each cylinder, there is a problem in that the connecting mechanism has a complicated structure. Furthermore, when the exhaust gas from each cylinder is concentrated by the exhaust manifold, the position where the exhaust gas is concentrated is separated from the exhaust port, because of a space needed for the exhaust control valve, which causes the problem of the exhaust manifold projecting from the cylinder block and the power unit being increased in size.

SUMMARY OF THE INVENTION

The present invention was conceived in order to overcome the foregoing problems of the related art. An object of the present invention is to provide an exhaust control valve mechanism for a two-cycle engine having an effective structure for mounting the exhaust control valves.

A further object of the invention is to provide an exhaust control valve mechanism for a two-cycle engine which has a simplified structure for mounting exhaust control valves, and improves efficiency of manufacturing and assembling the two-cycle engine.

The present invention is applicable to any two-cycle engines having exhaust control valves, regardless of the number of cylinders, e.g., a single or multiple cylinder engine.

The present invention is applicable not only to two-cycle engines including exhaust control valves for varying exhaust emission timing and two-cycle engines including exhaust control valves for performing combustion under active and hot ambience but also to two-cycle engines in which exhaust control valves control open areas of exhaust ports in accordance with the temperature of exhaust gases (as disclosed in Japanese Patent Laid-open Publication No. Hei 7-97912).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a two-cycle engine according to the present invention will be described with reference to the drawings.

Figure 1:
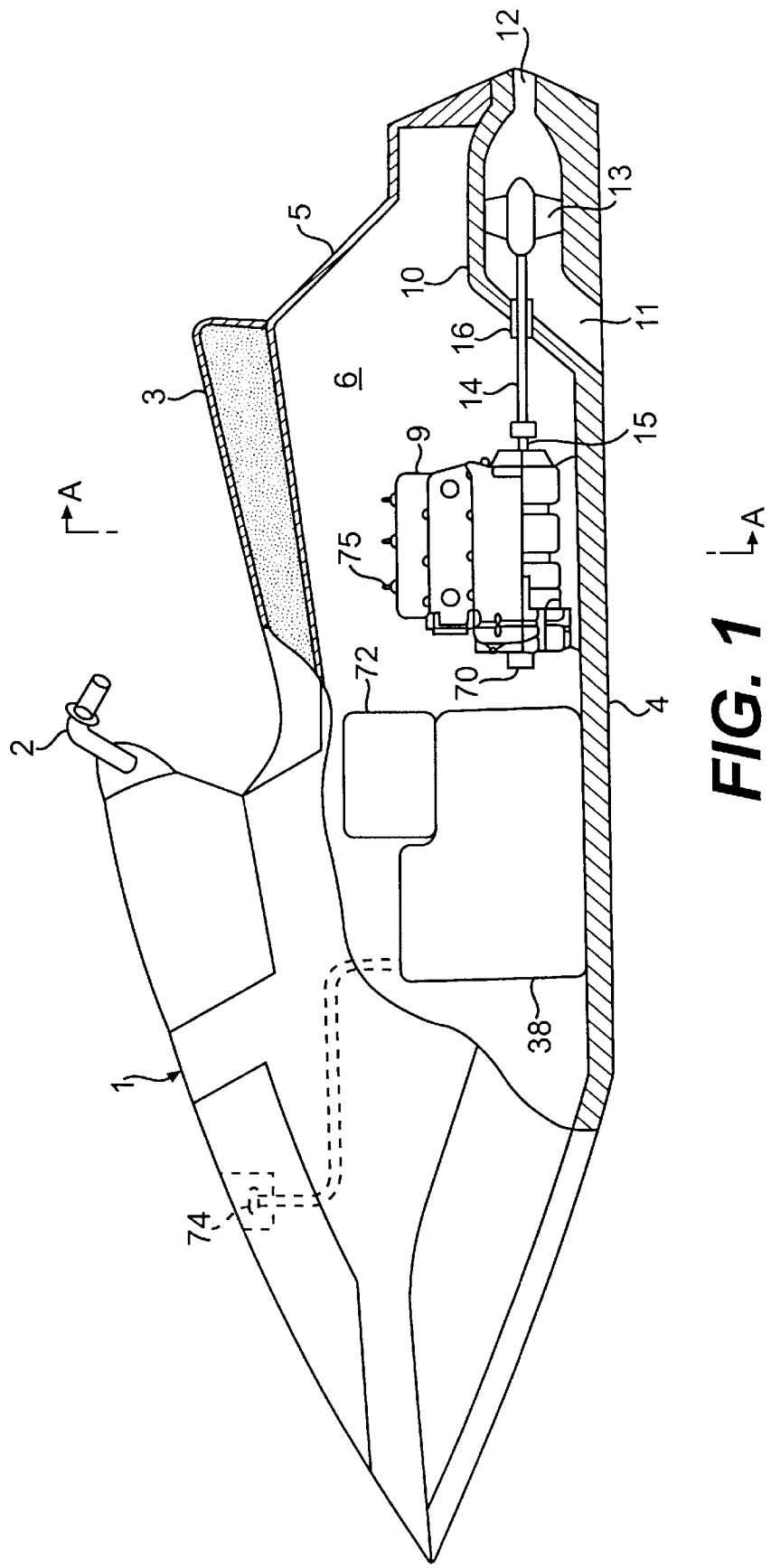
FIG. 1 is a side elevation showing a partial section of a jet propelled boat relating to one embodiment of the present invention.
Figure 2:
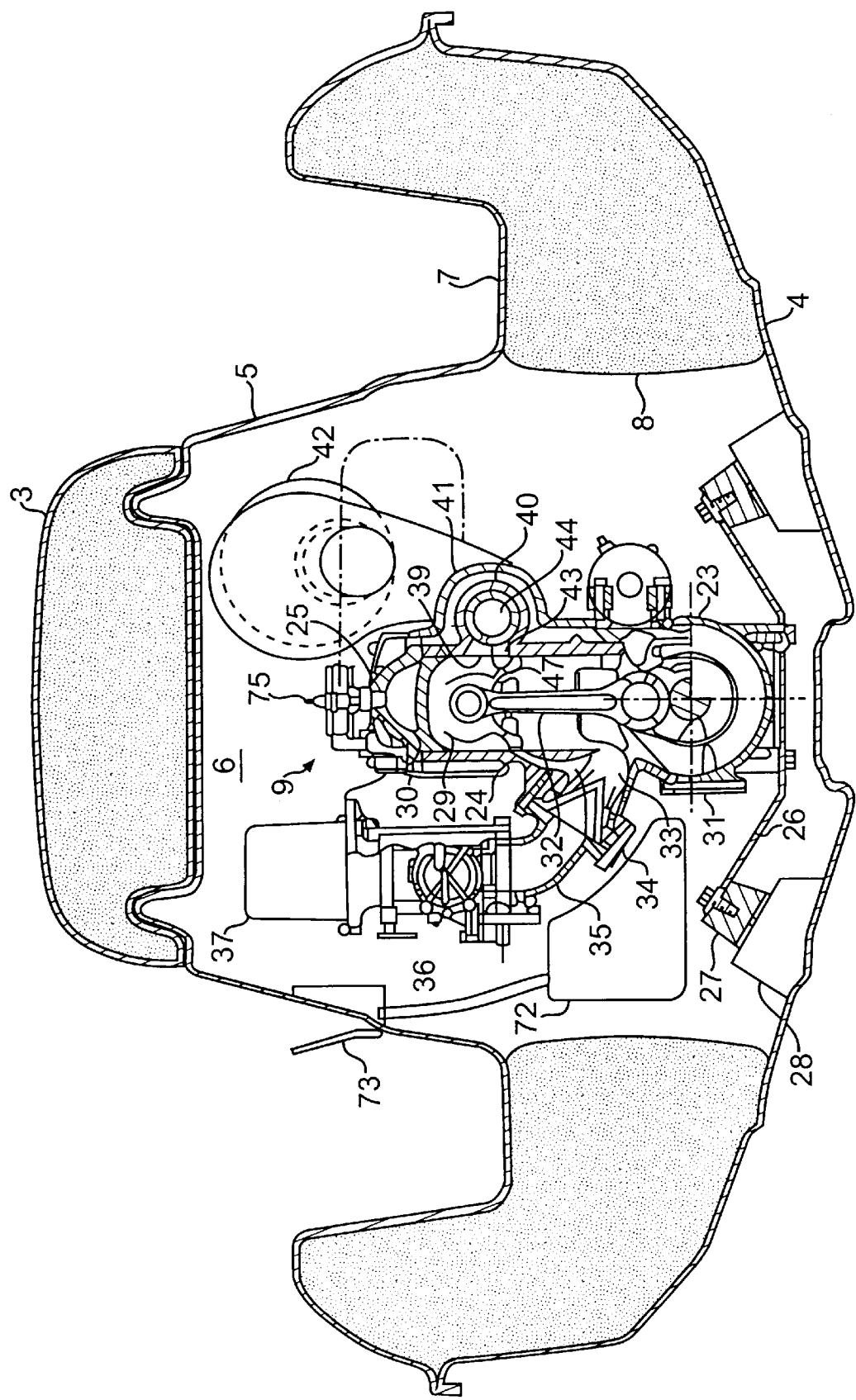
FIG. 2 is a cross sectional drawing along allows A—A in FIG. 1.

In the first embodiment, the invention is applied to a two-cycle, three-cylinder engine for a jet-propelled boat on which a rider sits astride, as disclosed in Japanese Patent Laid-open Publication No. Sho 62-59194 or No. Hei 5-246385. FIG. 1 is a side view, and a partial cross sectional view, of a jet-propelled boat, and FIG. 2 is a cross sectional view observed in the direction of arrow A—A in FIG. 1.

As shown in the drawings, the jet-propelled boat 1 includes a steering handle 2 substantially at its center, and a seat 3 in the shape of a saddle which is behind the steering handle 2. The rider sits astride the seat 3 (with his or her feet kept on footrests 7 shown in FIG. 2), and operates the steering handle 2 in order to propel the boat.

The boat 1 comprises a lower panel 4 and an upper panel 5 which are made of reinforced plastic (FRP) or the like, and are joined from both upper and lower sides. A vacant space 6 is defined by the upper and lower panels, so that the boat 1 has a buoyant structure. The footrests 7 are positioned at opposite sides of the seat 3 on the upper panel 5. A part of the space 6 under the footrest 7 houses a buoyant float 8.

A power unit mainly comprising a two-cycle engine 9 is housed in the space 6 in the boat 1. Specifically, the space 6 for housing the engine 9 is defined under the seat 3, and is relatively narrow in view of the center of gravity for assuring good steering feeling and a positional relationship with a jet propeller 10 which is present at a rear end of the boat 1.

The jet propeller 10 forms a channel from a water inlet 11 on a bilge of the boat to a jet nozzle 12 which opens at the rear end of the boat, and houses an impeller 13 which is rotatable in the channel. The impeller 13 is connected to an output shaft 15 of the engine 9 via a drive shaft 14. In FIG. 1, reference numeral 16 denotes a sealing member for maintaining the drive shaft 14 water-tight and enabling the drive shaft 14 to be freely rotatable.

When the engine 9 rotates the impeller 13, water introduced via the water inlet 11 is ejected, with a gush, via the jet nozzle 12, thereby propelling the boat 1 forward.

The engine 9 is a two-cycle engine in which tlu-ee cylinders are arranged in parallel with one another with respect to a crankshaft. The engine 9 is housed in the space 6 which is substantially in the shape of an inverted cone, and is present under the seat 3, with the crankshaft extending forward and backward along the length of the boat 1, and axes of the cylinders oriented toward the apex of the bilge in the shape of an inverted cone.

The engine 9 is mounted in the boat 1 in the following manner. A cylinder block 24 and a cylinder head 25 are stacked on a crankcase 23 one on top of the other so as to form one integral unit. The crankcase 23 is attached to an engine hanger 26, which is engaged via a mounting block 27 with bosses 28 formed on the lower panel 4.

Figure 3:
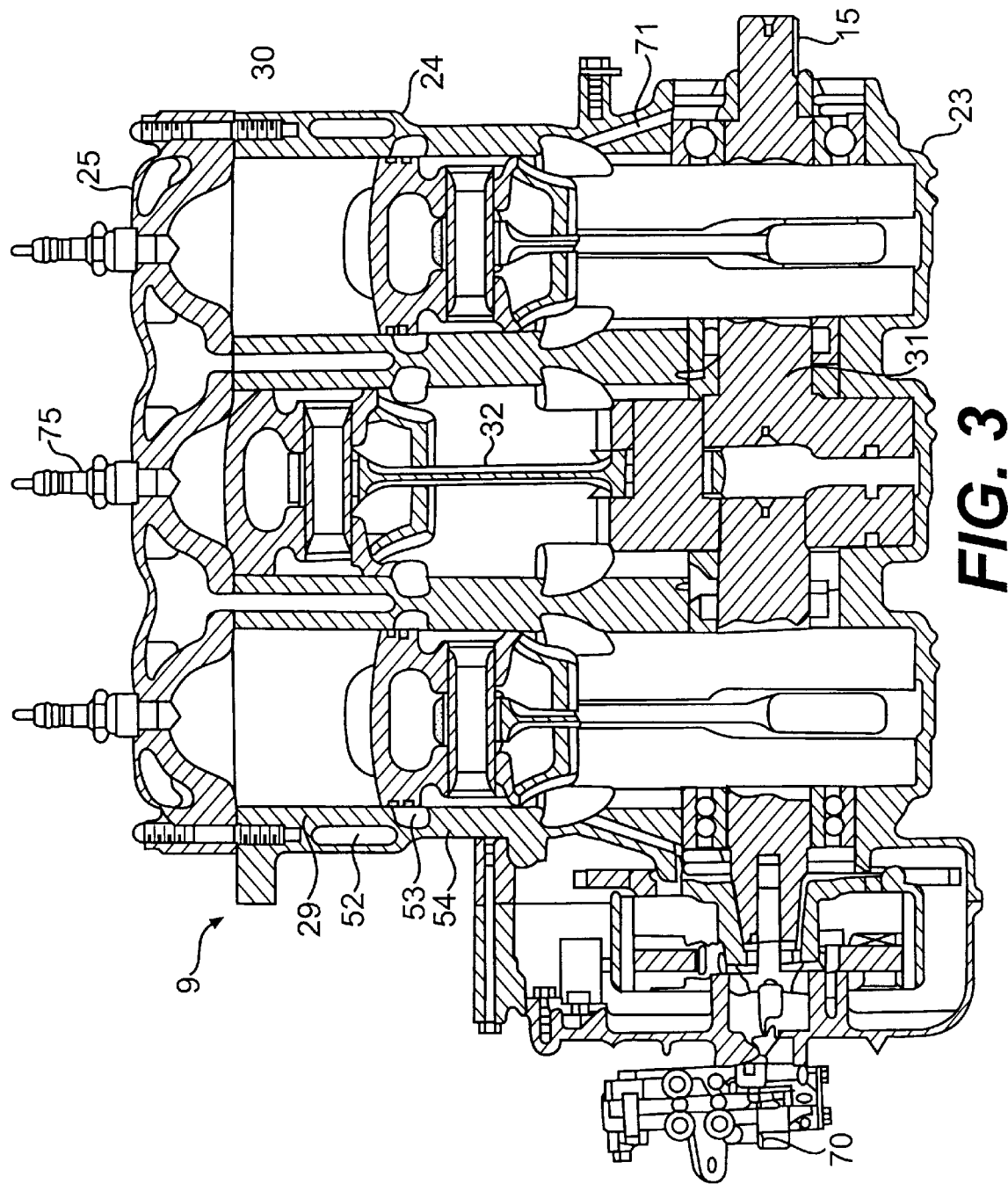
FIG. 3 is a vertical cross sectional drawing of a two-cycle engine relating to one embodiment of the present invention.

Referring to FIGS. 2 and 3, pistons 30 are slidably fitted in three cylinder holes 29 on the cylinder block 24. Each piston 30 is coupled to the crankshaft 31 via a connecting rod 32. The crankshaft 31 is rotated in response to the upward and downward movements of the pistons 50, so that a rotating force of the crankshaft 31 is transmitted from the output shaft 15 in order to rotate the impeller 13.

As shown in FIG. 3, each of the cylinders of a three cylinder engine 9 are 120 degrees out of phase, for example, if the middle piston 30 of the middle cylinder is at the uppermost position, the piston 30 of the cylinder to the left is at a position slightly raised from the lowermost position and the piston 30 of the cylinder to the right is at a position lowered slightly up from the lowermost position. Because of this angular relationship of the three cylinders, it is possible to obtain pulsation of exhaust gases even if the exhaust chamber is not provided.

Air intake ports 33 are formed on one side of the cylinder 24 (i.e., on the left side in FIG. 2), and are provided for the respective cylinders. The air intake ports 33 include reed valves 34 therein, and are connected to carburetors 36 via an intake manifold 35. An air cleaner 37 is positioned upstream of the carburetors 36. Fuel is supplied to the carburetors 36 from a fuel tank 38.

The operation of a throttle lever (not shown) connected to the steering handle 2 controls an opening amount of the throttle valves of the carburetors 36, and allows the air from the air cleaner 37 to be mixed with the fuel in the carburetors 36. An air-fuel mixture is then supplied to the crankcase 23 via the reed valves 34 and the intake manifold 35.

Figure 4:
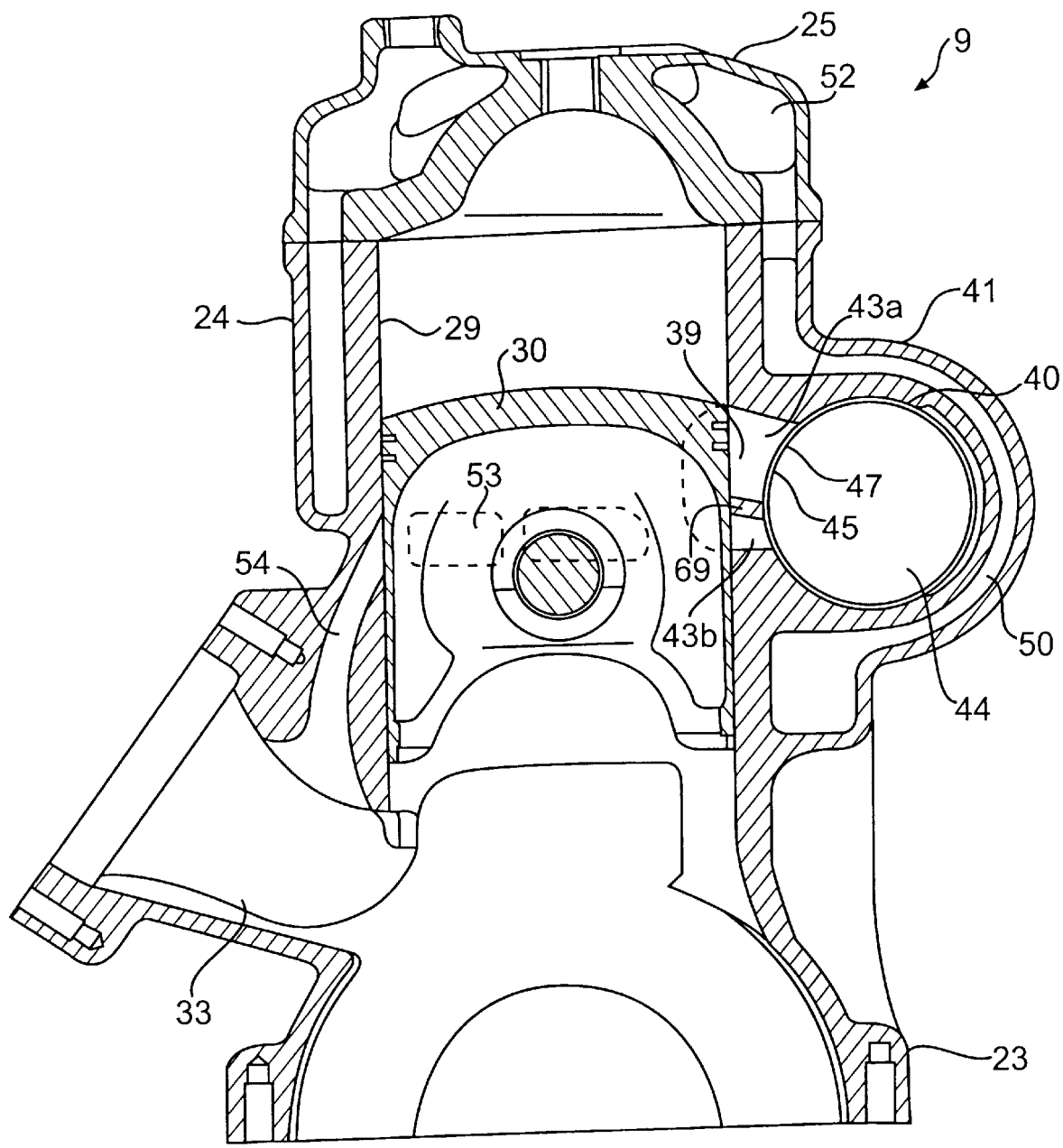
FIG. 4 is a vertical cross sectional drawing of essential parts of a two-cycle engine relating to one embodiment of the present invention.
Figure 5:
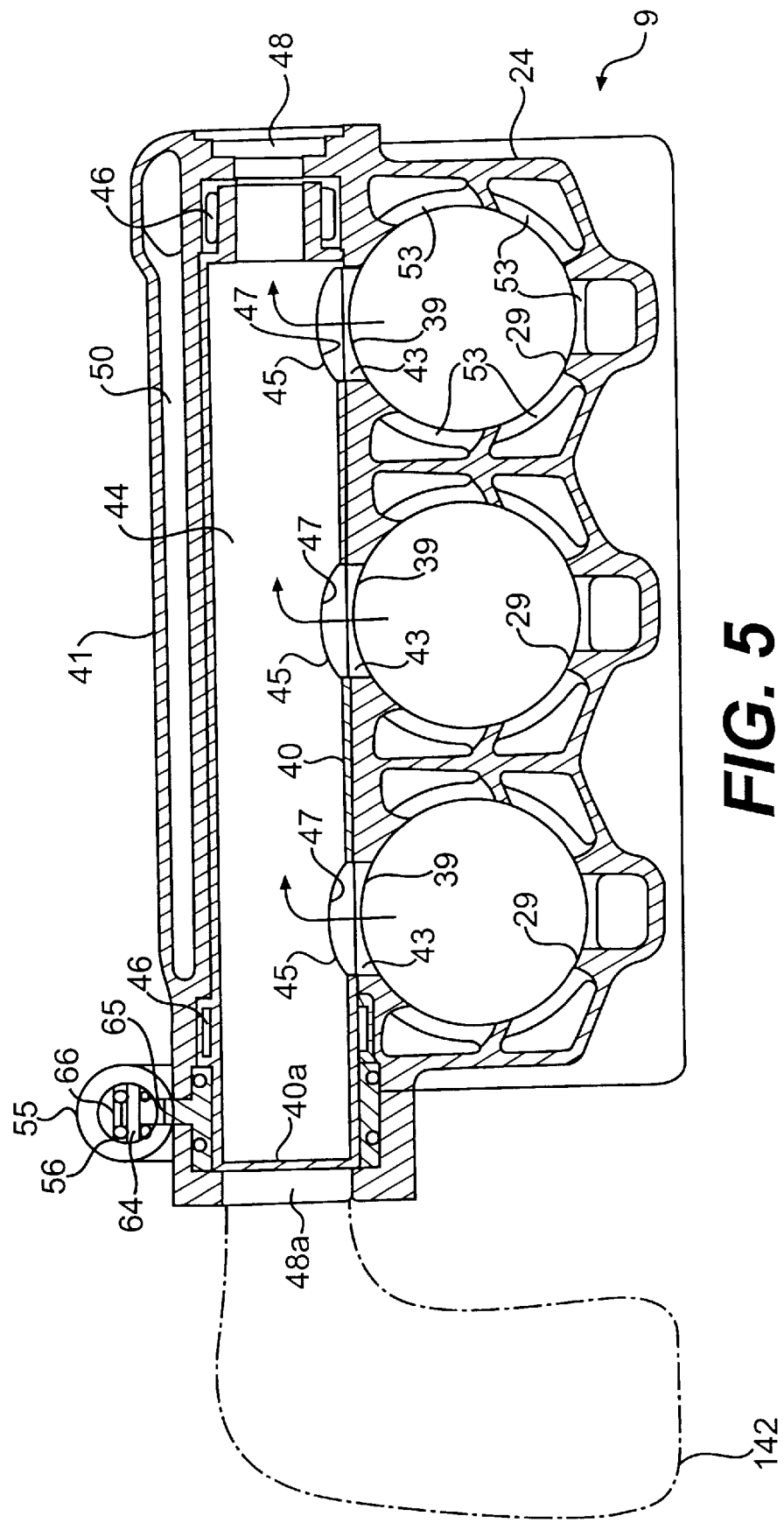
FIG. 5 is a horizontal cross sectional drawing of a two-cycle engine relating to one embodiment of the present invention.

As shown in detail in FIG. 4 and FIG. 5, exhaust ports 39 are formed on the other side of the cylinder 24 (i.e., on the right side in FIG. 2), and are provided for the respective cylinders. Each exhaust port 39 respectively communicates with a second exhaust passageway 43 formed in the cylinder block 24 for every cylinder.

There are a number of swollen out parts on the side of the cylinder block 24, and a first exhaust passageway 44 is formed inside the swollen section 41 extending in a direction orthogonal to the central axis of the exhaust port 39. Each second exhaust passageway 43 communicates with this first exhaust passageway 44 from that side, and exhaust gas from the exhaust port 39 of each cylinder is concentrated in the first exhaust passageway 44 through the respective second exhaust passageways 43. That is, the exhaust manifold is made up of the first exhaust passageway 44 and the second exhaust passageways 43.

The communication palt between the first exhaust passageway 44 and each of the second exhaust passageways 43 is called a communicating opening 45, and, as will be described later, these communicating openings 45 are positioned to be controlled when varying the cross sectional area of the exhaust passage in the exhaust control valve.

Each second exhaust passageway 43 has an exhaust port 39 at one side and a communicating opening 45 at the other side. The shape of each second exhaust passageway 43 is such that it forms a connection path between a curved surface of the exhaust port 39 and the curved surface of the communicating opening 45.

The first exhaust passageway 44 has a circular cross section, and an exhaust control valve 40 formed as a cylindrical member is freely rotatably housed in this first exhaust passageway 44 via a bearing 46.

Three cut-out openings 47 corresponding to each communicating opening 45 are also formed in the cylindrical side surfaces of the exhaust control valve 40. The first exhaust passageway 44 and the second exhaust passageways 43 are connected through the communicating opening 45 and the cut-out opening 47. Namely, part of a passageway section of the exhaust manifold comprised of the first exhaust passageway 44 and the second exhaust passageways 43 (a concentrating section) is formed by the inner passageway of the exhaust control valve 40.

As will be described later, the exhaust control valve 40 is driven, and rotates with the rotational axis (an axis parallel to the extending direction of the first exhaust passageway 44) as its center, and the opening area of the communicating opening 45 is varied between a fully open state and a fully closed state as an edge portion (a control edge) of the cut-out opening 47 blocks the communicating opening 45 from an upper side (namely the upper part of the exhaust port 39 in this example). The exhaust control valve 40 is driven so as to rock in response to boat speed using a cylinder apparatus that will be described later. The exhaust control valve 40 controls the opening area of the exhaust passageway so that there is an optimum exhaust opening ratio corresponding to the driving circumstances of the boat, so that when driving at low speed or low load the exhaust passage (actually, the exhaust port) is substantially closed to carry out heat activated atmosphere combustion to realize improved fuel economy and purified exhaust.

By providing the exhaust control valve 40 having the above-described structure, since there is no longer any need for a hollow portion or a bearing section in order to provide the control valve in the vicinity of the exhaust port 39, the increase in size of the cylinder block that normally results from these parts can be avoided, and it is possible to prevent obstruction to the flow of exhaust gases. Furthermore, because the second exhaust passageway 43 is formed as a space for absorbing at least the curved surface of the exhaust port 39 that runs along an inner surface of a cylinder hole, and the curved surface of the communicate opening 45 that runs along the inner surface of the first exhaust passageway 44, the length of the second exhaust passageway 43 is made as short as possible so as to satisfy the demand to downsize the cylinder block. Therefore, it is possible to reduce the size of the cylinder block 24, as well as to provide the cut-out opening 47 of the exhaust control valve 40 at a position extremely close to the exhaust port 39, without obstructing the flow of exhaust gases.

In the case of a multiple cylinder engine, there is no need for the individual exhaust control valves to be joined together, as in the related art, and by simplifying the structure around the engine it is possible to a reduce the size of the power unit.

As shown in FIG. 4, a rib 69 is provided inside the second exhaust passageway 43, dissecting the second exhaust passageway 43 into an upper passageway section 43a having a comparatively large cross sectional area, and a lower passageway section 43b having a comparatively small cross sectional area. By varying the rotation of the exhaust control valve 40 it is possible to obtain various conditions. For example, by completely releasing the communicating opening 45 from the cut-out opening 47 a completely open state is obtained, with the upper passageway section 43a communicating with the lower passageway section 43b. By lowering the control edge of the cut-out opening 47 as far as the rib 69, an intermediate state is obtained, with only the lower passageway section 43b open. By lowering the control edge of the cut-out opening 47 further, a completely closed state is obtained, with the upper passageway section 43a and the lower passageway section 43b being substantially closed off.

The above-described first exhaust passageway 44 is connected at one end to the exhaust chamber 42, via the opening 48 formed in the cylinder block 24. The exhaust chamber 42 is also connected to a silencer (not shown) provided behind a hull, and exhaust gas from the exhaust port 39 is discharged to the outside of the hull from the discharge port, via the first exhaust passageway 44 (an internal passageway of the exhaust control valve 40), the exhaust chamber 42 and the silencer. The exhaust gas flows in the first exhaust passageway 44 in a direction of the rotational axis of the exhaust control valve 40, and is discharged.

In the first embodiment, in order to simplify the manufacture of the cylinder block 24 the first exhaust passageway 44 is formed as a cylinder passing through the swollen section 41, and the exhaust control valve 40 is a cylindrical pipe having a base plate 40a as its bottom. The opening 48a is formed in the other end of the first exhaust passageway 44, substantially closed by this base plate 40a.

As shown in FIG. 4, a water jacket 50 for allowing cooling water to circulate is formed in the swollen section 41 of the cylinder block constituting the exhaust manifold. A water jacket 52 for allowing cooling water to circulate and communicating with the water jacket 50 is also formed in the cylinder head 25. The bearing of the exhaust control valve and the exhaust control valve 40 can be prevented from extreme heat by these water jackets.

Furthermore, a gas mixture that has been supplied into the crankcase 23 is compressed by lowering of the piston 50, and a scavenging operation in the 2-cycle engine is candied out by sending the gas mixture to the combustion chamber inside the cylinder through a scavenging path 54 and a scavenging port 53.

As shown in FIG. 5. a cylinder mechanism 55 forming a driving actuator of the exhaust control valve is attached to an outer wall of the cylinder block 24, and a piston rod 56 of this cylinder mechanism 55 is joined to the exhaust control valve 40 at its tip.

Figure 6:
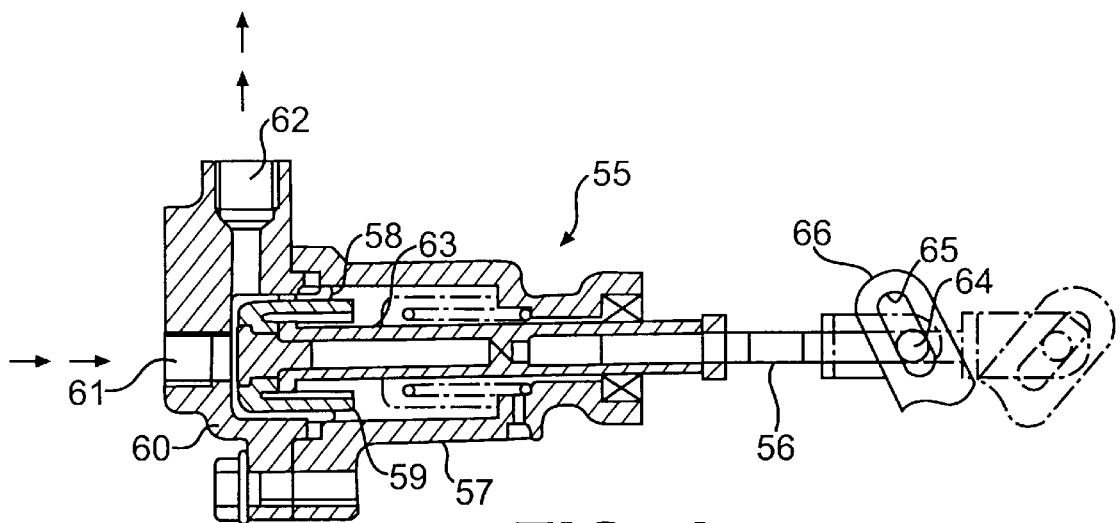
FIG. 6 is a cross sectional drawing showing the operating mechanism of an exhaust control valve relating to one embodiment of the present invention.

As shown in detail in FIG. 6, the cylinder mechanism 55 contains a piston 59 which slides freely inside the cylinder body 57 via a diaphragm 58, and a piston rod 56 protruding from the cylinder body 57 is attached to this piston 59. An inflow port 61 for supplying fluid to a pressure chamber 60 facing a surface of the piston 59 presented to the flow of gas, and an outflow port 62 for discharging fluid from the pressure chamber, are formed in the cylinder body 57. A return spring 63 for always urging the piston 59 in a direction of resisting the water pressure from the pressure chamber 60, is also provided.

Accordingly, if more than a certain fixed water pressure builds up in the pressure chamber 60, the piston 59 is operated against the return spring 63 and the piston rod protrudes to a certain extent. If the water pressure is reduced below a certain fixed level, the piston rod 56 is retracted by the return force of the return spring 63.

A shown in FIG. 5, a rotatable lever 66 protruding to the outside is attached to the exhaust control valve 40, and a pin 64 attached to the tip of the piston rod 56 is engaged with an elongated hole 65 formed in the lever 66. With this connecting structure, the lever 66 and the exhaust control valve 40 are rotated around the central axis of the exhaust control valve 40 by the operation of the piston rod 56.

Specifically, when the piston rod 56 is protruded as a result of build up of water pressure above a certain fixed level in the pressure chamber 60, the lever 66 rotates and the exhaust control valve 40 causes the communicating opening 45 of the exhaust path to be 100% open. If the water pressure is reduced below a certain fixed level, the piston rod 56 is retracted, the lever 66 rotates in the reverse direction, and the exhaust control valve 40 causes the communicating opening 45 to be in a fully closed state with the exhaust path substantially closed off. When the water pressure is between the fully open state and the fully closed state, the piston rod 56 protrudes halfway, and an intermediate state exists where the exhaust passage is formed through only the lower passageway section 43b of the second exhaust passageway 43.

Figure 7:
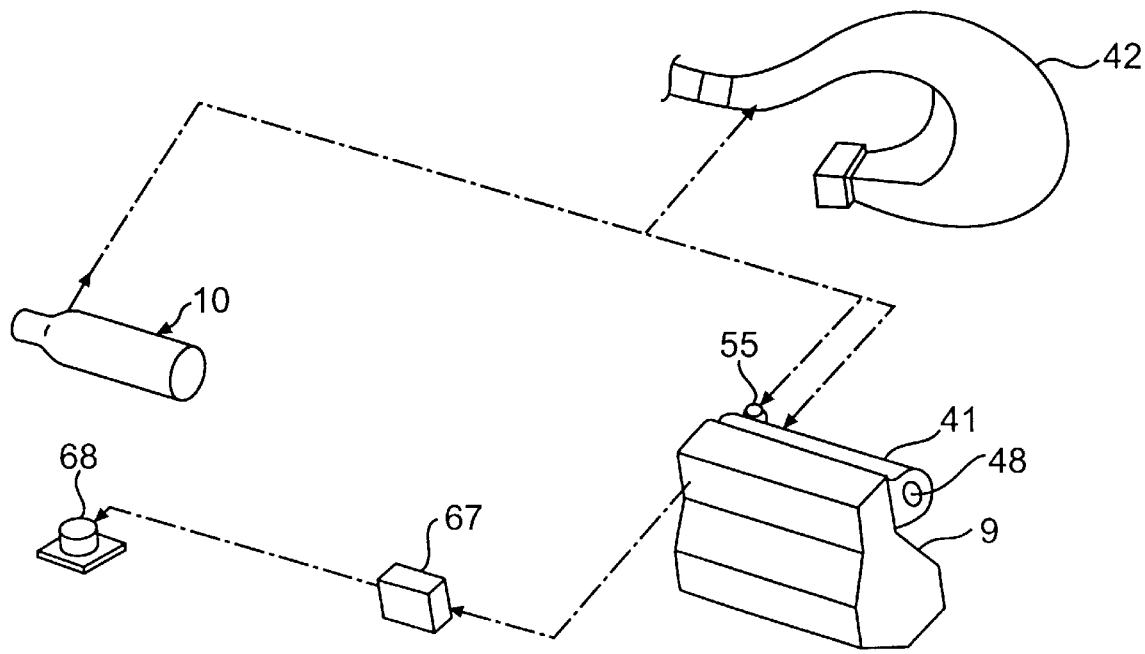
FIG. 7 is an explanatory drawing of a cooling water supply system relating to one embodiment of the present invention.

As shown in FIG. 7, a pressurized flow of water is supplied to the pressure chamber 60 of the cylinder mechanism 55 by a jet propulsion device 10. When raising the water pressure by raising the speed of a impeller 13, the surface area of the exhaust passageway is opened 100% by driving the exhaust control valve 40 in an opening direction. However, in a condition where the speed of the impeller 13 is not very high, (that is, an operating state at the time of low speed, low load) and the pressure of the water flow into the pressure chamber 60 is fairly low. The exhaust control valve 40 is then driven in a closing direction by the returning force of the return spring 63, and the surface area of the exhaust path is substantially closed to create conditions for activated heat atmosphere combustion. In this intermediate operating state, the exhaust control valve 40 blocks only the upper passageway section 43a as a result of the balance between the returning force of the return spring 63 and the pressure of the water flow into the pressure chamber 60, and combustion is performed having discharge of exhaust gas restricted to a specific extent.

In FIG. 7, 67 is a thermo case, and 68 is a drain plug for discharging cooling water to the outside of a boat.

As shown in FIG. 3, the engine 9 of the first embodiment is a separate oil supply system two-cycle engine. The engine has an oil pump 70 provided on a tip portion of the crankshaft 31. By driving the oil pump using the rotation of the crankshaft, a pressurized supply of lubricating oil can be provided from a lubricating oil tank 72 to various parts of the engine 9, via outways etc. provided in the cylinder block 24, and the like. The oilway 71 runs from the scavenging path 54 to a bearing section of the crankshaft 31 at an inner side of the oil seal 71a. Some of the lubricating oil that has been supplied into the engine goes into the oilway 71, to lubricate the crankshaft bearing, when returning to the scavenging path 54.

In FIG. 2, 73 is an oil lid for supplying lubricating oil to the lubricating oil tank 72. In FIG. 1, 74 is a fuel lead for supplying fuel to a fuel tank 38. Furthermore, 75 shown in FIG. 1 to FIG. 3 is a spark plug provided for each cylinder, and compressed gas in the internal combustion engine is ignited by these spark plugs.

The foregoing jet-propelled boat is driven by the rider who sits astride the seat 3 with his or her feet on the footrests 7 and operates the steering handle 2.

In high speed operating conditions, the exhaust control valve 40 puts the communicating opening 45 in a fully open state. The engine repeatedly performs the two-stroke processes and rotates the impeller 13 at a high speed, as follows.

The air-fuel mixture is supplied to the crankcase 23 via the intake ports 33, is supplied to the combustion chambers via the scavenging ports 54 in response to the downward movement of the pistons 50, is compressed by the upward movement of the pistons 50, is ignited by the spark plugs 75, and is burnt. Burnt gases are then scavenged from the exhaust ports 39 in response to the downward movement of the pistons 50.

Furthermore, if the impeller 13 is rotated at a low speed when the engine is operating under a low load, the exhaust control valves 40 put the communicating opening 45 into a fully closed state, and the engine keeps on performing the active heat atmosphere combustion, thereby improving the fuel economy and purification of exhaust gases at the low speed or under the low load.

At a certain operating condition in between the high speed operation and the low speed operation, the exhaust control valve 40 causes the communicating opening 45 to be closed by the extent of the upper passageway section 43a, discharge of exhaust gas from the engine is restricted to a certain extent, and improvement in fuel economy and purification of exhaust gases is realized at the intermediate operating condition.

When this type of engine 9 is operated, the exhaust gases discharged from the exhaust port 39 are discharged to the outside through the second exhaust passageway 43 and the first exhaust passageway 44 communicating with each other and having a smooth inner circumferential surface, so that the flow of exhaust gas is smooth, and it is possible to obtain the desired effect of exhaust pulsation using the exhaust chamber 42.

In the present invention, an exhaust chamber that provides the effect of exhaust pulsation is not essential, but if such an exhaust chamber is provided it is preferable to construct an exhaust system in which the path for draining exhaust gas and a path for obtaining exhaust pulsation are separated. Namely, as shown by the imaginary line in FIG. 5, an exhaust chamber 142 for obtaining exhaust pulsation is connected to an opening at the other end of the exhaust control valve 40 by removing the base plate 40a, and the efficiency of exhaust from the exhaust opening 48 is improved by removal of the exhaust chamber 42 provided in the path for draining exhaust gases, and the effect of pulsation of exhaust gases obtained by the exhaust chamber 142. With the structure of the present invention, in order to make it possible to make the second exhaust passageway 43 extremely short, an exhaust catalyst provided in the above described exhaust chamber 142 can be arranged close to the exhaust port 39. It is possible to improve the efficiency of exhaust purification by bringing high temperature exhaust gas into contact with a catalyst. At the same time, deterioration in the fit of the exhaust chamber brought about by variation in the temperature of the exhaust gas due to the catalytic reaction heat, and attenuation of reflected waves due to the catalytic substance, can be kept to a minimum, and high output is obtained.

Figure 8:
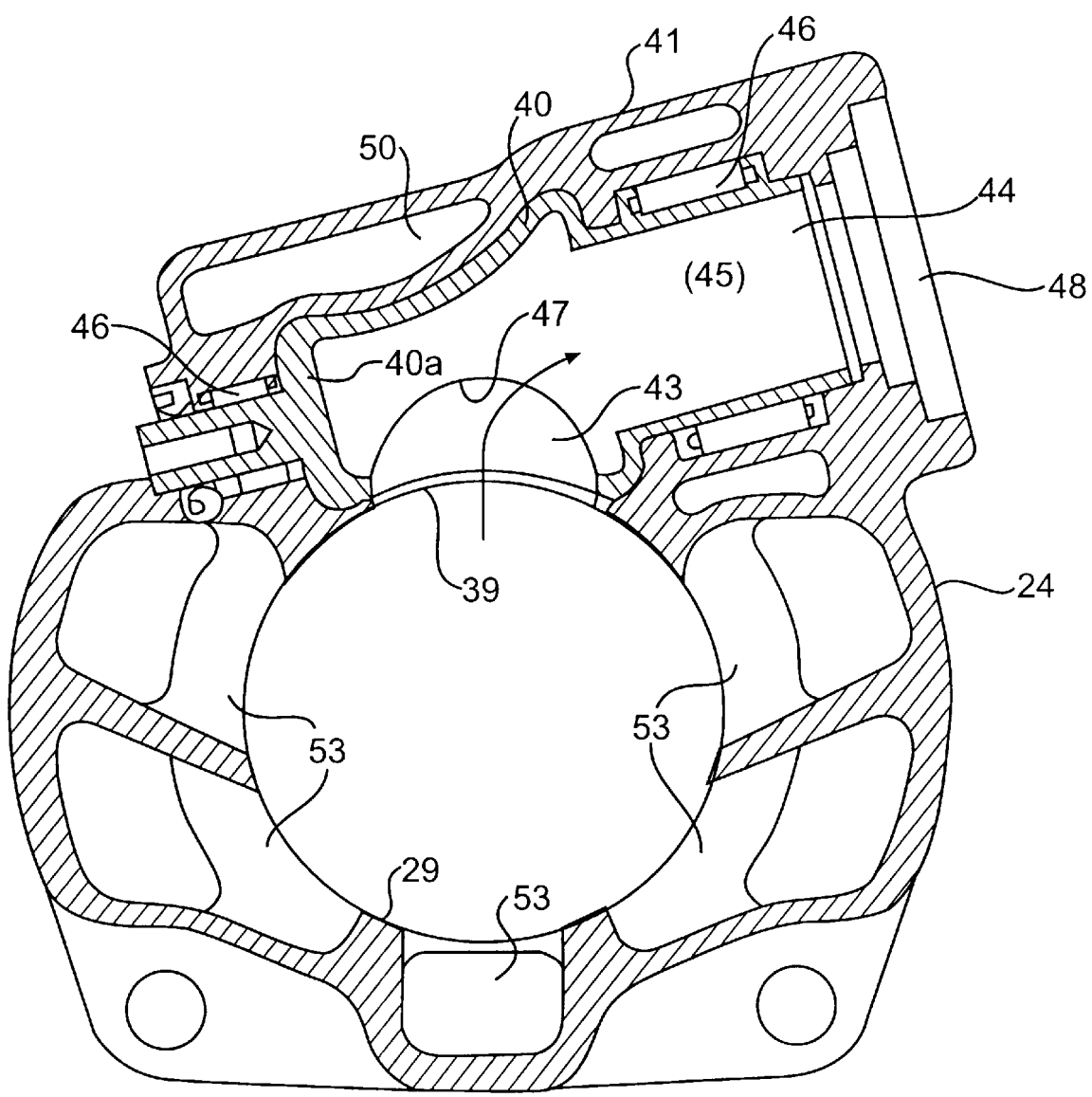
FIG. 8 is a plan drawing showing a horizontal cross section of a two-cycle engine relating to another embodiment of the present invention.

FIG. 8, shows another embodiment in which the present invention is applied to a single cylinder 2-cycle engine. The exhaust control valve 40 has been arranged extremely close to the exhaust port 39.

Parts that serve the same function as parts in the above-described embodiment have the same numerals assigned to them, and repeated description will be omitted.

In this example, the exhaust control valve 40 does not have a simple cylindrical shape, and a section forming the cut-out opening 47 has a cylindrical shape with a base 40a that has been formed in the shape of a top along the inner circumferential surface of the cylinder hole 29.

The exhaust control valve 40 is arranged close to the exhaust port 39 and is freely rotatable around the central axis, so as to connect the cut-out opening 47 with the exhaust port 39. That is, as the exhaust control valve 40 rotates, the control edge of the cut-out opening 47 passes over part of the communicating opening 45 (at a position shown in cross section in the drawing), which is connected to the exhaust port 39, and the second exhaust passageway 43 formed between the exhaust port 39 and the communicating opening 45 has a saddle shape with no length at the contact portion.

Although it does not appear at the position shown in cross section in FIG. 8, a lever is attached for rotation to the exhaust control valve 40, similarly to the above-described embodiment, and a cylinder mechanism 55 and a similar actuator are connected to this lever.

The exhaust port 39 is closed directly from the upper edge side by positioning the exhaust control valve 40, as has been described for this embodiment, and it is possible to change an open upper edge position where the exhaust port 39 opens to a lower side of a piston path stroke. Accordingly, by changing the rotational position of the exhaust control valve 40 according to the operating conditions of the 2-cycle engine, it is possible to change the exhaust timing and to run the engine more efficiently.

In each of the embodiments described above, an exhaust control valve is contained in the swollen section 41 of the cylinder block 24, but this swollen section 41 can be formed as a separate component to the cylinder block 24 and then attached to the cylinder block 24.

Also, a cylindrically shaped exhaust control valve 40 has been shown in each of the above described embodiments, but the control valve can be a plate body curved so as to make a cylindrical part.

Furthermore, the shape of the cut-out opening 47 of the exhaust control valve 40, or the shape of the communicating opening 45, can be a shape varying according to the rotational angle of the exhaust control valve 40, and by doing this it is possible to simply vary the surface area of an exhaust path non-linearly.

In the above described embodiments, the exhaust control valve 40 is described as being driven by a cylinder mechanism 55 operated by water pressure, but the exhaust control valve 40 can also be driven by various actuators such as a servo motor or a solenoid, etc., operated according to engine speed, engine load, throttle opening amount, and the like.

Furthermore, in the above-described embodiments, there has been shown a small boat ridden by sitting astride a saddle, but the present invention is also widely applicable to a two cycle engine mounted in a vehicle such as a motorcycle, etc.

As has been described above, according to the present invention, the exhaust path comprises the first passageway extending in a direction orthogonal to the central axis of the exhaust port, and the second passageway connecting the first path and the exhaust port, and the control valve is provided in the first path so as to freely rotate. The surface area of an opening connecting the first path and the second path is variable by varying the rotational position of the control valve. In order to carry out control by activated heat atmosphere combustion and control of exhaust timing, etc., it is no longer necessary to provide a hollow section for housing the exhaust control valve at a position close to the exhaust port of the cylinder, or a bearing for supporting the exhaust control valve, and it is possible to reduce the size of the cylinder block and to realize smooth flow of exhaust gases by making the inner peripheral surface of the exhaust path smooth, and improvements in exhaust efficiency can be realized by using the effects of exhaust pulsation.

Furthermore, even in the case of a multiple cylinder engine, the exhaust control valve of each cylinder can be constructed as an integral component, which means that there is no need for a separate mechanism for connecting each exhaust control valve, and since exhaust gas can be concentrated by using this exhaust valve (the first path section), the exhaust gas can be concentrated at a position close to the exhaust port which makes possible an exhaust manifold structure that does not extend too much from the cylinder block. Overall, it is possible to reduce the size of a power unit by simplifying the structure around the engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An exhaust control valve structure for a 2-cycle engine comprising:

an exhaust passage communicating with an exhaust port of a cylinder hole, said exhaust passage including a first passageway extending in a direction intersecting a central axis of the exhaust port and a second passageway communicating between the exhaust port and said first passageway;

an exhaust control valve for varying a cross-sectional area of said exhaust passage, said exhaust control valve being mounted for rotation between open and closed positions about an axis generally parallel to an extending direction of said first passageway, a surface area of a communicating opening between said first passageway and said second passageway being varied as said exhaust control valve rotates, said exhaust control valve being a cylindrical tube having a cut-out formed in a wall of said exhaust control valve adjacent to said second passageway, said exhaust control valve including a first, closed end and a second, open end, said second, open end being mounted for rotation by a bearing;

a lever attached to said second end, said lever extending radially outwardly from said second end of said exhaust control valve; and a cylinder mechanism having a piston rod thereof operatively connected to said lever for rotating said lever and said exhaust control valve between the open and the closed positions, said cylinder mechanism including a pressure chamber for receiving water under pressure to control operation of said cylinder mechanism.

2. The exhaust control valve structure for a 2-cycle engine as in claim 1, wherein said exhaust control valve is mounted for rotation about an axis substantially orthogonal to an axis of the cylinder hole, and wherein an exhaust timing of the engine is varied by said exhaust control valve moving from the open to the closed position from an upper edge side of said second passageway.

3. The exhaust control valve structure for a 2-cycle engine as in claim 2, wherein said first passageway is of circular cross section, and wherein when said cut-out opening is aligned with said second passageway, exhaust gas that has flowed in through said cut-out opening from the cylinder hole flows into said exhaust control valve in a direction of the rotational axis of said exhaust control valve.

4. The exhaust control valve structure for a 2-cycle engine as in claim 1, wherein said second passageway comprises:
   two exhaust passages located one above the other; and
   a rib separating said two exhaust passages.

5. The exhaust control valve structure for a 2-cycle engine as in claim 4, wherein said exhaust control valve is rotatable to the open position to open said two exhaust passages, the closed position to close said two exhaust passages, and an intermediate position between the open and the closed positions to close one of said two exhaust passages, leaving the other of said two exhaust passages open.

6. The exhaust control valve structure for a 2-cycle engine as in claim 1, wherein said exhaust control valve structure is mounted in a jet propelled boat, and said cylinder mechanism receives water under pressure from a jet propulsion device of the jet propelled boat.

7. An exhaust control valve structure for a 2-cycle engine comprising:
   a first exhaust passageway extending generally perpendicular to at least one cylinder hole;
   at least one second exhaust passageway extending between said first exhaust passageway and a respective exhaust port of the at least one cylinder hole;
   an exhaust control valve for opening and closing said at least one second exhaust passageway, said exhaust control valve being mounted for rotation about an axis generally parallel to said first exhaust passageway, and said exhaust control valve being a cylindrical tube having a cut-out formed in a wall of said exhaust control valve adjacent to said second exhaust passageway, said exhaust control valve including a first, closed end and a second, open end, said second, open end being mounted for rotation by a bearing;
   a lever attached to said second end, said lever extending radially outwardly from said second end of said exhaust control valve; and
   a cylinder mechanism having a piston rod thereof operatively connected to said lever for rotating said lever and said exhaust control valve between the open and the closed positions, said cylinder mechanism including a pressure chamber for receiving water under pressure to control operation of said cylinder mechanism.

8. The exhaust control valve structure for a 2-cycle engine as in claim 7, wherein said exhaust control valve is mounted for rotation about an axis substantially orthogonal to an axis of the cylinder hole, and wherein an exhaust timing of the engine is varied by said exhaust control valve moving from the open to the closed position from an upper edge side of said at least one second exhaust passageway.

9. The exhaust control valve structure for a 2-cycle engine as in claim 8, wherein said first exhaust passageway is of circular cross section, and wherein when said cut-out opening is aligned with said at least one second exhaust passageway, exhaust gas that has flowed in through said cut-out opening from the cylinder hole flows into said exhaust control valve in a direction of the rotational axis of said exhaust control valve.

10. The exhaust control valve structure for a 2-cycle engine as in claim 7, wherein said at least one second exhaust passageway comprises:
   two exhaust passages located one above the other; and
   a rib separating said two exhaust passages.

11. The exhaust control valve structure for a 2-cycle engine as in claim 10, wherein said exhaust control valve is rotatable to the open position to open said two exhaust passages, the closed position to close said two exhaust passages, and an intermediate position between the open and the closed positions to close one of said two exhaust passages, leaving the other of said two exhaust passages open.

12. The exhaust control valve structure for a 2-cycle engine as in claim 7, wherein there are a plurality of said second exhaust passageways and said cylindrical tube extends between said plurality of second exhaust passageways.

13. The exhaust control valve structure for a 2-cycle engine as in claim 12, wherein a cut-out is provided in said cylindrical tube respectively for each of said plurality of second exhaust passageways.

14. The exhaust control valve structure for a 2-cycle engine as in claim 7, wherein said exhaust control valve structure is mounted in a jet propelled boat, and said cylinder mechanism receives water under pressure from a jet propulsion device of the jet propelled boat.

15. An exhaust control valve structure for a 2-cycle engine, comprising:
   a first exhaust passageway;
   a second exhaust passageway;
   a cylindrical exhaust control valve within said first exhaust passageway, said cylindrical exhaust control valve mounted for rotation about an axis passing through a center of said first exhaust passageway and a center of said cylindrical exhaust control valve for opening and closing said second exhaust passageway, and said exhaust control valve being a cylindrical tube having a cut-out formed in a wall of said exhaust control valve adjacent to said second exhaust passageway, said exhaust control valve including a first, closed end and a second, open end, said second, open end being mounted for rotation by a bearing;
   a lever attached to said second end, said lever extending radially outwardly from said second end of said exhaust control valve; and
   a cylinder mechanism having a piston rod thereof operatively connected to said lever for rotating said lever and said exhaust control valve between the open and the closed positions, said cylinder mechanism including a pressure chamber for receiving water under pressure to control operation of said cylinder mechanism.

16. The exhaust control valve structure for a 2-cycle engine as in claim 15, wherein said exhaust control valve structure is mounted in a jet propelled boat, and said cylinder mechanism receives water under pressure from a jet propulsion device of the jet propelled boat.

17. An exhaust control valve structure for a 2-cycle engine comprising:
   an exhaust passage communicating with an exhaust port of a cylinder hole, said exhaust passage including a first passageway extending in a direction intersecting a central axis of the exhaust port and a second passageway communicating between the exhaust port and said first passageway;
   an exhaust control valve for varying a cross-sectional area of said exhaust passage, said exhaust control valve being mounted for rotation between open and closed positions about an axis generally parallel to an extending direction of said first passageway, a surface area of a communicating opening between said first passageway and said second passageway being varied as said exhaust control valve rotates, said exhaust control valve being a cylindrical tube having a cut-out formed in a wall of said exhaust control valve adjacent to said second passageway, said exhaust control valve including a first, closed end and a second, open end, said second, open end being mounted for rotation by a bearing;

said second passageway including two exhaust passages located one above the other and a rib separating said two exhaust passages; and wherein said exhaust control valve is rotatable to the open position to open said two exhaust passages, the closed position to close said two exhaust passages, and an intermediate position between the open and the closed positions to close one of said two exhaust passages, leaving the other of said two exhaust passages open.

18. An exhaust control valve structure for a 2-cycle engine comprising:

a first exhaust passageway extending generally perpendicular to at least one cylinder hole;

at least one second exhaust passageway extending between said first exhaust passageway and a respective exhaust port of the at least one cylinder hole;

an exhaust control valve for opening and closing said at least one second exhaust passageway, said exhaust control valve being mounted for rotation about an axis generally parallel to said first exhaust passageway, and said exhaust control valve being a cylindrical tube having a cut-out formed in a wall of said exhaust control valve adjacent to said second exhaust passageway, said exhaust control valve including a first, closed end and a second, open end, said second, open end being mounted for rotation by a bearing;

said at least one second exhaust passageway including two exhaust passages located one above the other and a rib separating said two exhaust passages;

wherein said exhaust control valve is rotatable to the open position to open said two exhaust passages, the closed position to close said two exhaust passages, and an intermediate position between the open and the closed positions to close one of said two exhaust passages, leaving the other of said two exhaust passages open.

\* \* \* \* \*